UNITED STATES PATENT OFFICE.

FRITZ BENDER, OF MÜHLHEIM, HESSE, GERMANY, ASSIGNOR TO A. LEONHARDT & CO., OF SAME PLACE.

RED COLORING-MATTER.

SPECIFICATION forming part of Letters Patent No. 350,230, dated October 5, 1886.

Application filed July 27, 1886. Serial No. 209,207. (No specimens.)

*To all whom it may concern:*

Be it known that I, FRITZ BENDER, a subject of the Emperor of Germany, residing at Mühlheim, in the Grand Duchy of Hesse, Germany, have invented a new and useful Improvement in Red Coloring-Matters, of which the following is a specification.

Paranitrotoluol is converted into its mono-sulpho compound by being heated with fuming sulphuric acid, and the sodium salt thereof, by being treated with caustic soda-lye, is transferred into a red condensation product. The latter, by reducing it in an alkaline or acidulous solution, is converted into a new amido-sulpho acid, hardly soluble in water and in alcohol, the principal characteristics of which are that its diazo derivates, in combination with aromatic amines and phenols, and also with the sulpho and carbon compounds of them, form dye-stuffs which can be fixed on cotton without mordant and stand soaping.

As an example of the manner in which this red coloring-matter may be prepared, I proceed as follows: Thirty kilos of the sodium salt of the new amido-sulpho acid are dissolved in water and diazotized by means of ten kilos nitrite and thirty-five kilos of concentrated muriatic acid. The diazo body precipitates on cooling, and after standing is brought into reaction with twenty-eight to thirty-five kilos of a mixture of betanaphthylamine and betanaphthylamine sulpho-acid. The color is immediately produced, is converted into its sodium salt, and dried. According to the shade to be obtained, more or less of the one or the other of the two components of said mixture is employed. By increasing the amount of the betanaphthylamine sulpho-acid a more brilliant color is obtained, while a darker color is obtained by allowing the betanaphthylamine to be in excess. By dispensing with the one or the other of the two components the extremes of said shades are attained. This way manufactured it forms a dark-brownish red powder, dissolving in water with an intense purple color, in concentrated sulphuric acid with a beautifully-dark blue. An aqueous solution, when treated with hydrochloric acid, renders a deep-blue precipitate.

This dye-stuff principally excels by dyeing cotton a beautiful purple without any mordants.

Having thus described my invention and the manner of employing the same, what I claim, and wish to have secured by Letters Patent of the United States, is—

1. The production of a red coloring-matter by treating the soda salt of a paranitrotoluol mono-sulpho acid by caustic soda-lye, reducing the so-obtained red product of condensation into a hardly-soluble amido sulpho acid, diazotizing the latter, and combining the obtained diazo product with a mixture of hydrochloric salt of betanaphthylamine and a sodium salt of betanaphthylamine sulpho-acid, or only with the one or the other component of said mixture.

2. The red coloring-matter herein described, having the properties to be a dark-brown red powder which dissolves in water with an intensive purple color, and in concentrated sulphuric acid with a beautiful blue color, the watery solution, when treated with hydrochloric acid, giving a blue precipitate, and the said coloring-matter having, further, the property of being fixable on cotton without any mordant, giving a purple-like color.

In testimony whereof I have signed my name to this specification in the presence of two subscribing witnesses.

FRITZ BENDER.

Witnesses:
 FRANZ WIRTH,
 JOSEPH PATRICK.